US006871231B2

United States Patent
Morris (10) Patent No.: US 6,871,231 B2
(45) Date of Patent: Mar. 22, 2005

(54) ROLE-BASED ACCESS TO IMAGE METADATA

(75) Inventor: Robert Paul Morris, Raleigh, NC (US)

(73) Assignee: IPAC Acquisition Subsidiary I, LLC, Peterborough, NH (US)

( * ) Notice: Subject to any disclaimer, the term of this patent is extended or adjusted under 35 U.S.C. 154(b) by 802 days.

(21) Appl. No.: 09/754,178

(22) Filed: Jan. 3, 2001

(65) Prior Publication Data

US 2002/0088000 A1 Jul. 4, 2002

(51) Int. Cl.[7] .............................................. G06F 13/00
(52) U.S. Cl. ...................... 709/225; 709/219; 709/229; 707/10
(58) Field of Search ................................. 709/217, 219, 709/223, 225, 227, 229; 707/9, 10; 713/201

(56) References Cited

U.S. PATENT DOCUMENTS

| 5,734,893 A | * | 3/1998 | Li et al. ........................ 707/4 |
| 5,760,917 A | * | 6/1998 | Sheridan ...................... 358/442 |
| 6,148,333 A | * | 11/2000 | Guedalia et al. ............. 709/219 |
| 6,434,607 B1 | * | 8/2002 | Haverstock et al. ......... 709/217 |
| 6,577,311 B1 | * | 6/2003 | Crosby et al. ............... 345/428 |
| 6,704,769 B1 | * | 3/2004 | Comstock et al. ........... 709/204 |

* cited by examiner

*Primary Examiner*—Viet D. Vu
(74) *Attorney, Agent, or Firm*—Sawyer Law Group LLP (57) ABSTRACT

A system and method for controlling access to image metadata is disclosed, where metadata elements are defined for an image. The method and system include associating users who will access the image with roles, and associating the roles with individual metadata elements. In response to receiving a request for access to the metadata by a particular user, the user's role is determined from the request and the user's role is compared to the roles associated with the metadata elements to determine which metadata elements to make available to the user.

33 Claims, 6 Drawing Sheets

FIG. 6

ROLE-BASED ACCESS TO IMAGE METADATA

FIELD OF THE INVENTION

The present invention relates to digital image metadata, and more particularly to method and system for controlling which sets of image metadata are accessible to a user.

BACKGROUND OF THE INVENTION

One advantage of digital cameras over film based cameras is that digital cameras have the ability to associate metadata with a captured image that may later be accessed by a viewer. For example, once the digital image has been transferred from the digital camera to a PC and displayed, a user may also view information about the image, such as date and time of capture, the name of the image, and image size, for instance. Metadata may be either stored with the image or stored separately in a separate database. If the metadata is stored with the image, then the metadata is typically stored as tags within the image file of the captured image.

For example, a standards organization referred to as the Digital Imaging Group (DIG) has developed a DIG35 Metadata Specification that provides a set of metadata definitions to the imaging industry. The DIG35 metadata specification for describing elements of an image is independent of the imaging application or the image file format used.

By associating metadata with digital images, every image that is uploaded to the Internet and shared with others around the globe may be its own stand-alone catalog record that can be used by each recipient for a variety of purposes.

Businesses, professionals and consumers can all utilize metadata in order to manage images. One example use of metadata is professional photographers associating information about camera settings, copyright information and image manipulation techniques within the image in order to recreate images and document their work. Additionally, metadata enables consumers to share their captured and experiences images by using metadata to tell the story or narration behind their images. For example, users may use image-editing software on their PC to add explanatory captions to each photo from their vacation, and then upload those photos to a photo-sharing website. Assuming the photo website was DIG35 compatible, the photo website would understand and save all the captions. Friends and family may then access the photo website and not only see the pictures, but read and/or hear the story and history behind each image by accessing the metadata.

The use of metadata with digital imaging provides users with the advantage of being able to access a wide variety of data regarding the image. When a user accesses the image, however, the user is typically shown all the metadata associated with that image. Access to the metadata is currently an all are nothing proposition when a user views the metadata via a photo-sharing site, or when the metadata is retrieved from an image file directly or from a database. Although each user of the metadata may have different interest and needs with respect to the metadata, there is currently no control over what each user views, adds, or edits.

Accordingly, what is needed is an improved method for providing users access to digital image metadata. The present invention addresses such a need.

SUMMARY OF THE INVENTION

The present invention provides a method and system for controlling access to image metadata. The method and system include associating users who will access the image with roles, and associating the roles with individual metadata elements. In response to receiving a request for access to the metadata by a particular user, the user's role is determined from the request and the user's role is compared to the roles associated with the metadata elements to determine which metadata elements to make available to the user.

According to the system and method disclosed herein, different users of the metadata with different interest in the data will automatically be provided access to only the metadata that they need to view, add, or edit based on their assigned roles.

DESCRIPTION OF THE INVENTION

The present invention relates to enabling the customization of tags within digital images captured with an image capture device. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. For example, although the preferred embodiment explained in terms of a digital camera, one of ordinary skill in the art will readily recognize that any portable device capable of capturing images could be used, such as a cellphone or PDA equipped with a lens attachment, for instance. Thus, the present invention is not intended to be limited to the embodiments shown but is to be accorded the widest scope consistent with the principles and features described herein.

Figure 1:
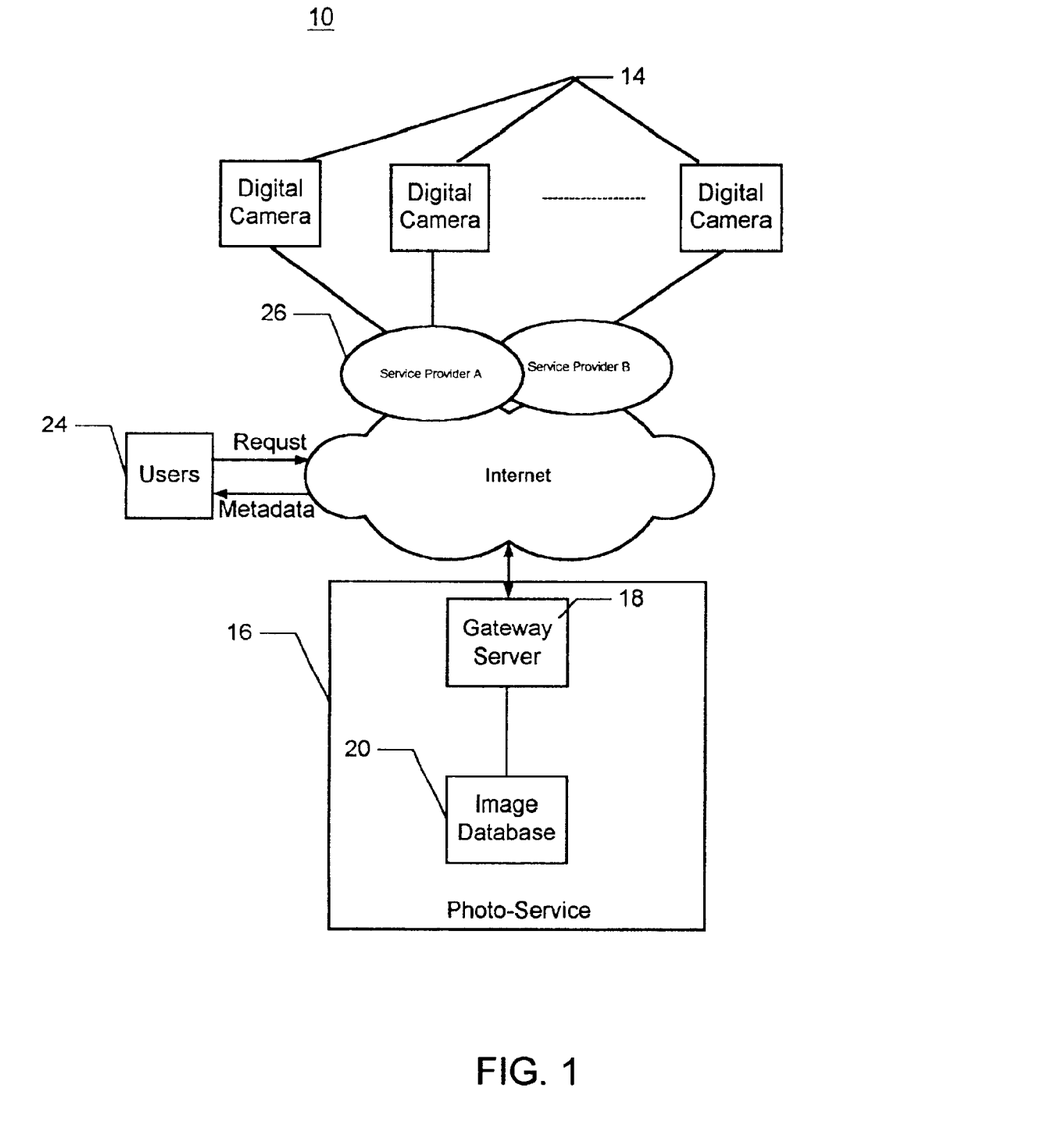
FIG. 1 is a block diagram illustrating one possible system environment for use with the present invention in accordance with a preferred embodiment.

FIG. 1 is a block diagram illustrating one possible system environment for use with the present invention in accordance with a preferred embodiment. The system 10 includes one or more digital cameras 14 and an online photo-service site 16. The digital cameras 14 capture digital images and store the images on an internal memory, and have the capability of uploading the captured images to the online photo-service site 16 either directly or via a PC. To upload the images directly from the cameras 14, the cameras 14 may be provided with wireless connectivity for connecting to the Internet, although a wired connection method may also be used. In one embodiment, the cameras 14 may connect to the Internet via a service provider 26, which may include a wireless carrier and/or an Internet service provider (ISP).

The online photo-service site 16 includes a gateway server 18 for receiving the images and an image database 20 for storing the images. The photo-service 16 may include other servers besides the gateway server 18, but for simplicity, the function of the other servers will be described as being performed by the gateway server 18. Once the images are uploaded, the images may be stored in a user or business account. The images and their metadata may then be viewed and managed over the Internet by users 24 through a web browser or other software application. Users may also access the images from the gateway server 18 directly from the digital cameras 14 or other such portable electronic device.

Figure 2:
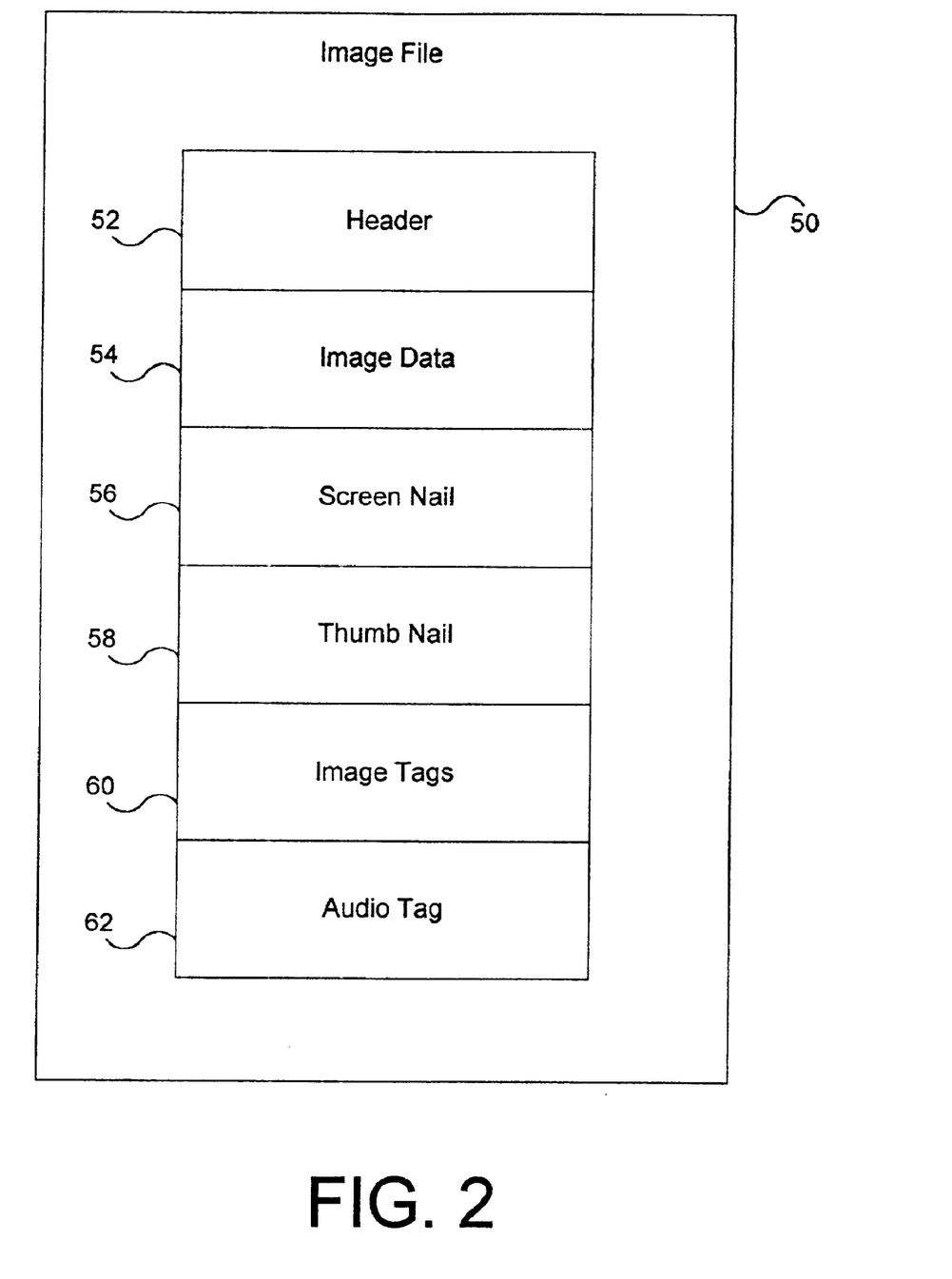
FIG. 2 is a block diagram illustrating a diagram of one embodiment for an image file.

FIG. 2 is a block diagram illustrating a diagram of one embodiment for an image file 50. Image file 50 preferably includes a header 52, image data 54, a screennail 56, a thumbnail 58, image tags 60, and an audio tag 62. Header 52 preferably includes information that identifies and describes the various contents of image file 50. Image data 54 contains actual captured image data, the resolution of which depends on the settings of the camera 14. Image data 54 is typically stored in JPEG format, but may exist in whichever format is appropriate for the current location of image file 50 within the image processing chain of the camera 110. Screennail 56 and thumbnail 58 are each different versions of image data 54 that have varying degrees of reduced resolution for a number of special viewing applications.

The metadata for the images is preferably stored within the image file 50 in individual image tags 60, each of which store various types of data that correspond and relate to particular captured image data 54. In a preferred embodiment, each image tag 60 may store an individual metadata data element or may store a metadata data structure, described further below. Audio tag 62 stores any sound that has been recorded for the image.

Figure 3:
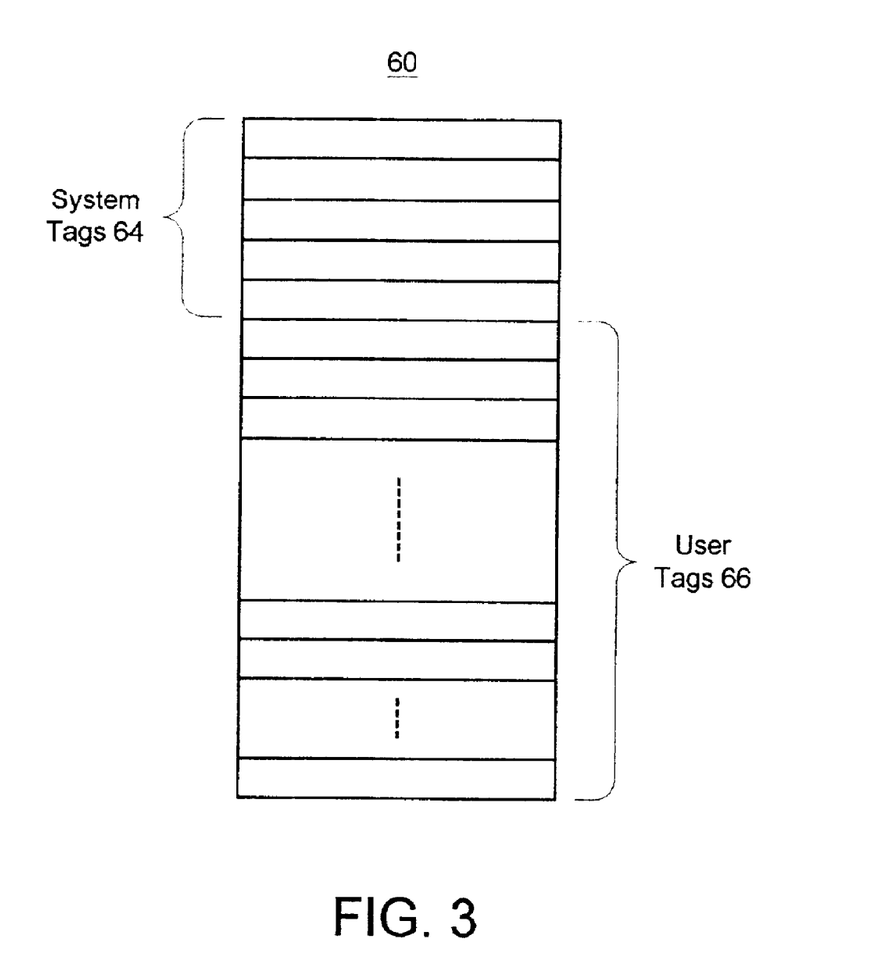
FIG. 3 is a diagram showing of one embodiment for the image tags.

Referring to FIG. 3, a diagram of one embodiment for the image tags 60 is shown for illustration. In the FIG. 3 embodiment, image tags 60 include system tags 64, and user tags 66. System tags 64 preferably include various types of camera information that preserve command settings at the moment of capture and correlate with the captured image data 54. For example, system tags 64 may indicate focus setting, aperture setting, and other relevant information that may be used for effectively processing or analyzing the corresponding image data. The data written to the system tags 64 is controlled by the camera 14 and preferably cannot be modified by the user 24.

User tags 66, however, are provided to enable the storage of data that the user 24 enters on the camera 14 or that was populated by a software application. For example, a stamp tag may be provided for storing a label a user has entered on the camera to apply to a given image, such as "birthday" or "vacation". Thus, the function of the stamp tag is to store label data.

The present invention provides an improved method for allowing users to access metadata associated with a digital image file 50. The process begins by defining metadata elements for an image file 50. Particular roles (e.g., job roles) are then associated with the individual metadata elements defined for the image, and each role is assigned certain access privileges for the metadata element to which they are associated, such as read, write, and modify. All users who will access the image are assigned particular roles. In one preferred embodiment, the users are identified by ID numbers, such as a user IDs, class IDs, and/or group IDs, and are then assigned roles based on their IDs.

After the metadata elements in the image file has been populated with data and stored on a server or other device, users may make requests from the server to access the image and its metadata. The user's role is then compared to the roles associated with the metadata elements in the image file to determine what metadata elements to make available to the user for reading, writing or modifying.

In accordance with the present invention, the roles and access privileges associated with the metadata are stored in the image file 50 as metadata that the gateway server 18 accesses to control access to the image as the image file 50. In an alternative embodiment, the roles and access privileges may be stored in a file separate from the image file 50 and transmitted along with the image file 50.

Although the software for implementing the present invention preferably resides on the gateway server 18, where users make request from the gateway server to view images from image database 20, the software may also be loaded on individual PCs of the users, where the users transmit image files 50 to each other directly.

Figure 4:
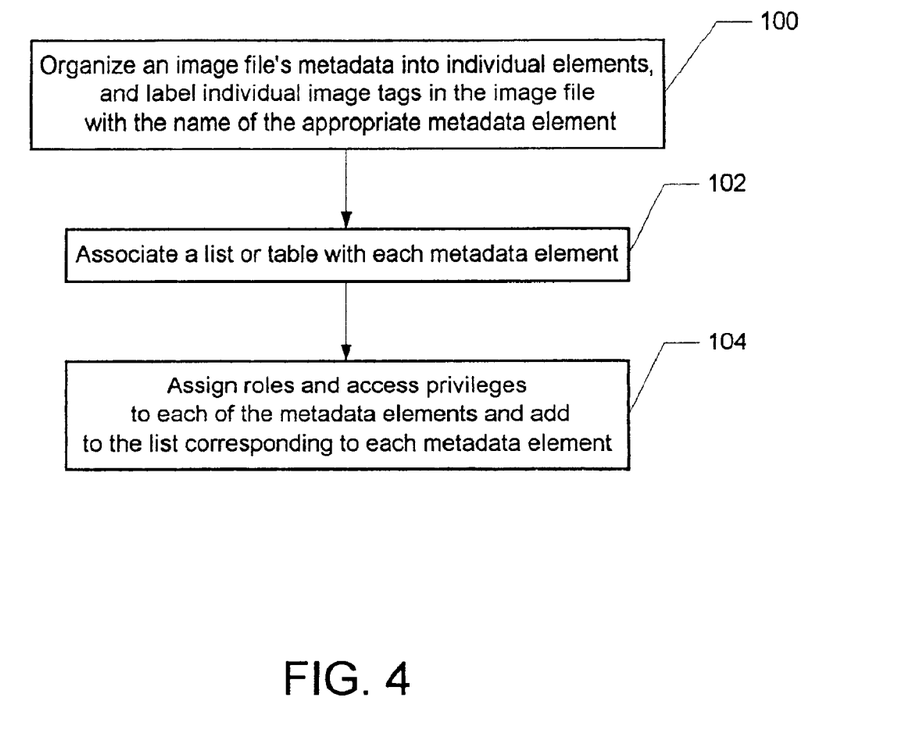
FIG. 4 is a flow chart illustrating the process for assigning roles and access privileges to metadata elements in further detail.

FIG. 4 is a flow chart illustrating the process for assigning roles and access privileges to metadata elements in further detail. The process begins by organizing an image file's metadata into individual elements, and labeling individual image tags 60 in the image file 50 with the name of the appropriate metadata element in step 100. Next, a list or table is then associated with each metadata element in step 102. The roles and access privileges are assigned as appropriate to each of the metadata elements and are added to the list corresponding to each metadata element in step 104. Each metadata element may comprise a variable or a data structure. The set of metadata elements defined for a particular type of image file 50 and the roles associated with the metadata are application-specific, as shown in FIG. 5.

Figure 5:
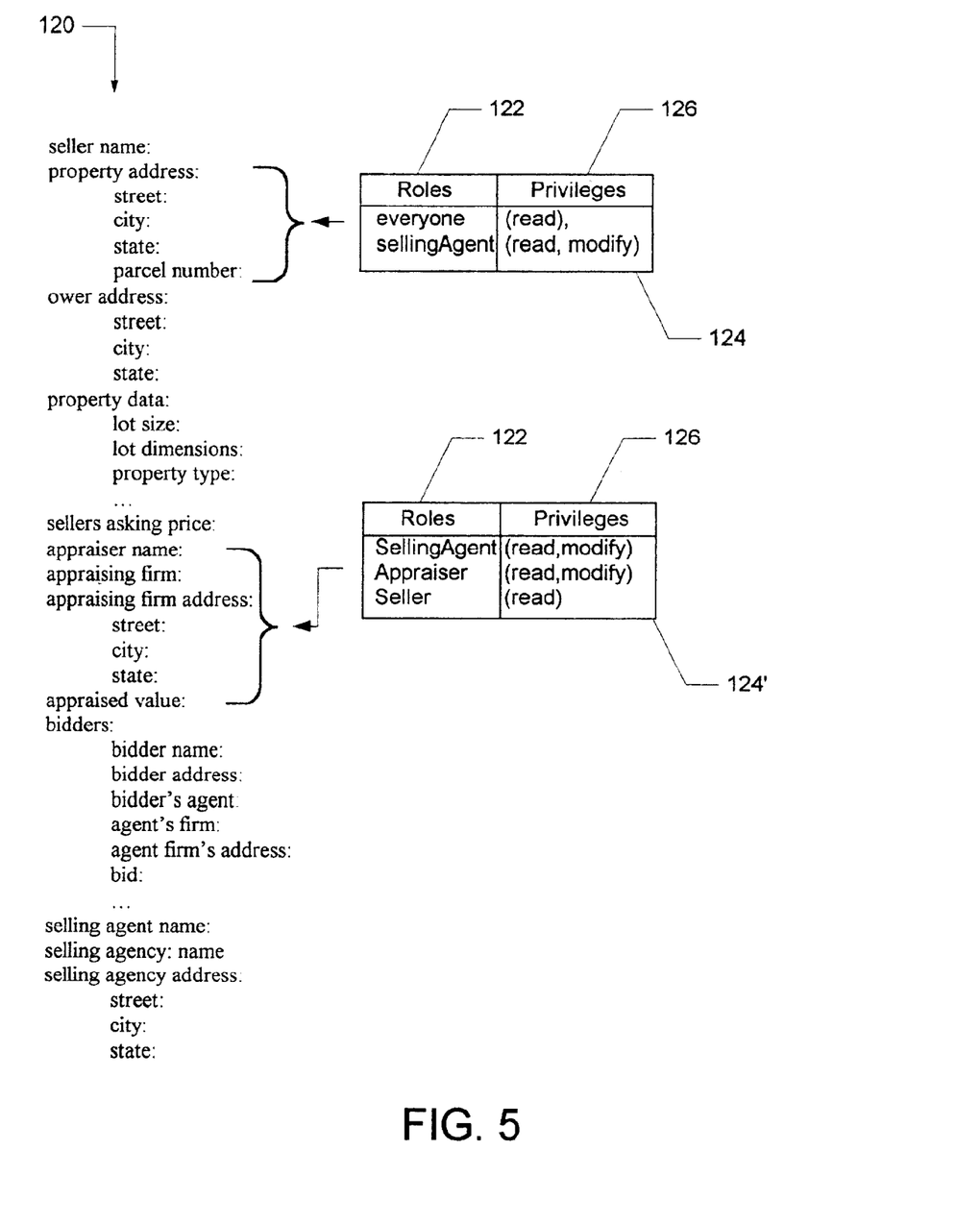
FIG. 5 is a diagram illustrating an example set of metadata and roles assigned to the metadata for use in a real estate application.

FIG. 5 is a diagram illustrating an example set of metadata and roles assigned to the metadata for use in a real estate application. For the real estate application, the roles associated with an image might be "sellers agent", "buyers agent", "buyer", "seller", "appraiser", etc. The metadata elements 120 associated with the image might include the properties address, name of seller, sellers asking price, a list of bidders and their current bids, bidders credit ratings, seller's current mortgage information, the properties characteristics such as dimensions, amenities, and so on.

A list 124 is associated with each metadata element 120 or group of elements 120, which includes the roles 122 that are allowed to access that metadata element 120 and the access privileges 126 defining what type of access allowed. For example, an appraiser would be allowed read access to property data, which characterizes the property: its address, dimensions, amenities, and other data related to valuation. The appraiser would be allowed to add the appraisal value to the metadata. An appraiser would not be allowed access to the seller's asking price or any of the bid information. The two agents may be allowed to see all the data.

After the metadata elements 120, the roles 122, and the access privileges 126 are defined for a particular type of image file 50, the image file 50 is used to store actual image data 54 and the metadata elements (tags 60) within image file 50 are populated with data. After that image file 50 containing the data has been stored, different users may make requests to access the image file 50 and its metadata.

Figure 6:
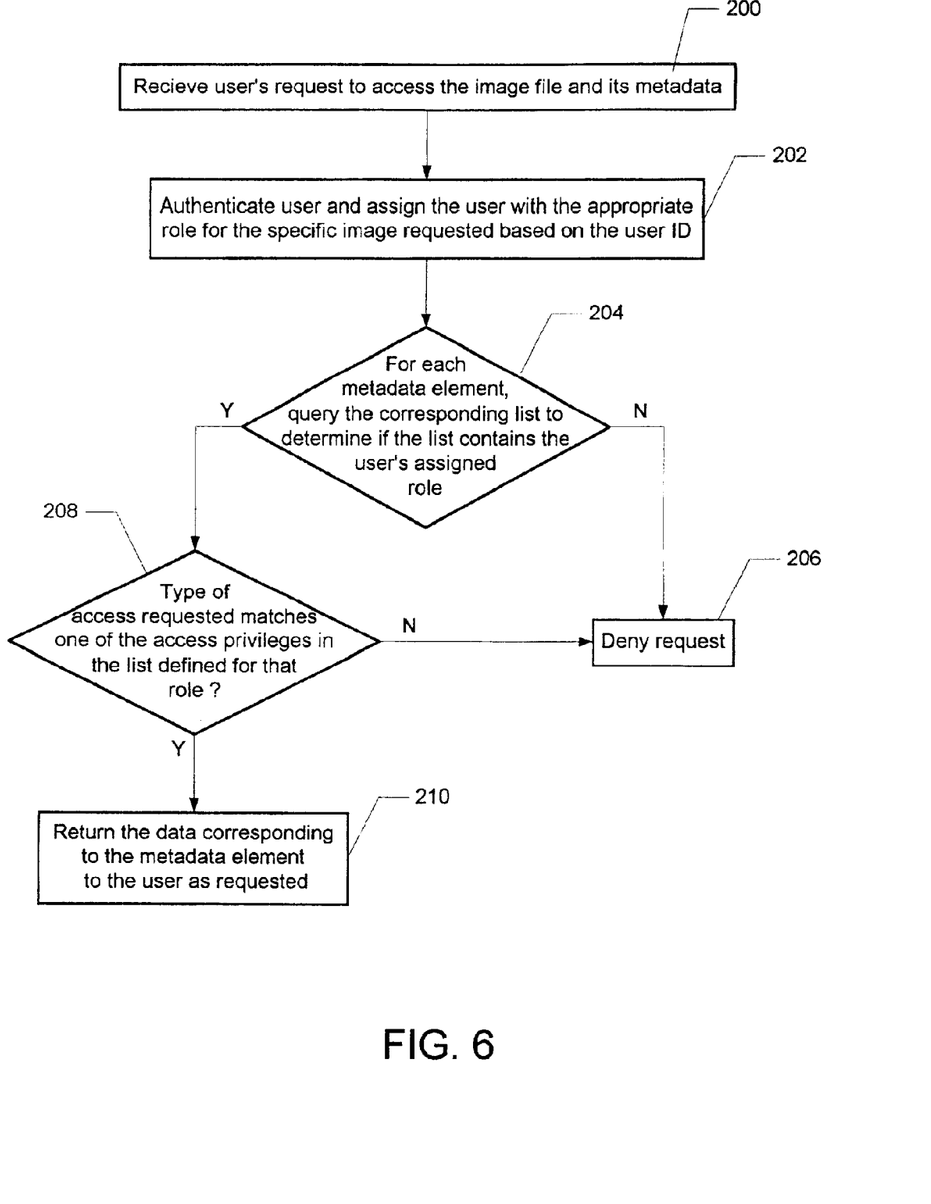
FIG. 6 is a flow chart illustrating the process of determining whether to grant or deny a request for image metadata in one preferred embodiment.

FIG. 6 is a flow chart illustrating the process of determining whether to grant or deny a request for image metadata in one preferred embodiment. The user's request to access the image file 50 and its metadata is received in step 200. In a preferred embodiment, the request includes the user's ID and identifies the type of access desired. The user is then authenticated and assigned the appropriate role for the specific image requested based on the user ID in step 202. For each metadata element, the corresponding list is queried to determine if the list contains the user's assigned role in step 204. If the user's role is not found in the list, access to that metadata element is denied in step 206. If the user's role is found in a list, then it is determined if the type of access requested matches one of the access privileges in the list defined for that role in step 208. If the type of access requested matches one of the access privileges in the list, then the data corresponding to the metadata element is returned to the user as requested in step 210. If the type of access requested does not match one of the access privileges in the list in step 208, then the request to access the image metadata is denied in step 206.

As an example, assume the user submitted a request to "view" the metadata associated with a particular image. If the role assigned to the user does not match the role assigned to any of the metadata elements, the user will not be allowed to view any of the metadata. If the role assigned to the user does match the role assigned to one of the metadata elements, but the access privileges assigned to that role for the element does not include the view privilege, the user will not be allowed to view the data for that element.

According to the system and method disclosed herein, different users of the metadata with different interest in the data will automatically be provided access to only the metadata that they need to view, add, or edit based on their assigned roles.

A method for controlling user access to image metadata has been disclosed. Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for controlling access to image metadata, comprising the steps of:
   (a) defining metadata elements for an image;
   (b) associating users who will access the image with roles;
   (c) associating the roles with individual metadata elements;
   (d) receiving a request for access to the metadata by a particular user, wherein the user's role is determined from the request; and
   (e) comparing the user's role to the roles associated with the metadata elements to determine which metadata elements to make available to the user.

2. The method of claim 1 further including the step of assigning access privileges to each of the roles.

3. The method of claim 2 further including the step of allowing the user to read, write, or modify the metadata based on the access privilege of the user's role.

4. The method of claim 3 further including the step of assigning user IDs to the users and to the individual metadata elements.

5. The method of claim 4 further including the step of receiving the user's ID in the request and using the user's ID to determine the user's role.

6. The method of claim 5 further including the step of associating a list with each metadata element, the list including roles assigned to the metadata element and corresponding access privileges.

7. The method of claim 6 further including the step of denying the request if the role assigned to the user does not match any of the roles assigned to the metadata elements.

8. The method of claim 7 further including the step of denying the request if access privileges assigned to the user do not match the assess privilege assigned to the metadata element.

9. A system for controlling access to image metadata comprising:
   means for defining metadata elements for an image;
   means for associating users who will access the image with roles;
   means for associating the roles with individual metadata elements;
   means for receiving a request for access to the metadata by a particular user, wherein the user's role is determined from the request; and
   means for comparing the user's role to the roles associated with the metadata elements to determine which metadata elements to make available to the user.

10. The system of claim 9 wherein access privileges are assigned to each of the roles.

11. The system of claim 10 wherein the user is allowed to read, write, or modify the metadata based on the access privilege of the user's role.

12. The system of claim 11 wherein user IDs are assigned to the users and to the individual metadata elements.

13. The system of claim 12 wherein the user's ID is received in the request and using the user's ID to determine the user's role.

14. The system of claim 13 wherein a list is associated with each metadata element, the list including roles assigned to the metadata element and corresponding access privileges.

15. The system of claim 14 wherein the request is denied if the role assigned to the user does not match any of the roles assigned to the metadata elements.

16. The system of claim 15 wherein the request is denied if access privileges assigned to the user do not match the assess privilege assigned to the metadata element.

17. A computer readable medium containing program instructions for controlling access to image metadata, the instructions for:
   (a) defining metadata elements for an image;
   (b) associating users who will access the image with roles;
   (c) associating the roles with individual metadata elements;
   (d) receiving a request for access to the metadata by a particular user, wherein the user's role is determined from the request; and
   (e) comparing the user's role to the roles associated with the metadata elements to determine which metadata elements to make available to the user.

18. The computer readable medium of claim 17 further including the instruction of assigning access privileges to each of the roles.

19. The computer readable medium of claim 18 further including the instruction of allowing the user to read, write, or modify the metadata based on the access privilege of the user's role.

20. The computer readable medium of claim 19 further including the instruction of assigning user IDs to the users and to the individual metadata elements.

21. The computer readable medium of claim 20 further including the instruction of receiving the user's ID in the request and using the user's user ID to determine the user's role.

22. The computer readable medium of claim 21 further including the instruction of associating a list with each metadata element, the list including roles assigned to the metadata element and corresponding access privileges.

23. The computer readable medium of claim 22 further including the instruction of denying the request if the role assigned to the user does not match any of the roles assigned to the metadata elements.

24. The computer readable medium of claim 23 further including the instruction of denying the request if access privileges assigned to the user do not match the assess privilege assigned to the metadata element.

25. A method for controlling access to image metadata, comprising the steps of:

(a) defining metadata elements for an image file;

(b) associating particular roles with individual metadata elements;

(c) assigning each role certain access privileges for the metadata element to which the access privileges are associated;

(d) assigning particular roles to users who will access the image;

(e) after the image file being populated with data and stored, receiving a request to access the image and its metadata, wherein the role assigned to the user is determined from the request; and (f) comparing the role assigned to the user with the roles associated with the metadata elements in the image file to determine what metadata elements to make available to the user for reading, writing or modifying.

26. The method of claim 25 further including the step of associating a list with at least one metadata element that indicates the roles that are allowed to access that metadata element and the access privileges defining what type of access allowed.

27. The method of claim 26 further including the step of determining whether to grant or deny access to the metadata by:

for each metadata element, querying the corresponding list to determine if the list contains the role assigned to the user;

if the user's role is not found in the list, denying access to that metadata element;

if the user's role is found in a list, then determining if the type of access requested matches one of the access privileges in the list defined for that role;

if the type of access requested matches one of the access privileges in the list, returning data corresponding to the metadata element to the user as requested; and if the type of access requested does not match one of the access privileges in the list, denying the request to access the image metadata.

28. The method of claim 27 further including the step of storing the roles and access privileges associated with the metadata in the image file.

29. The method of claim 27 further including the step of storing the roles and access privileges in a file separate from the image file.

30. A method for controlling access to image metadata, comprising the steps of:

(a) defining metadata elements for an image;

(b) associating users who will access the image with IDs;

(c) associating the IDs with individual metadata elements;

(d) receiving a request for access to the metadata by a particular user, wherein the request includes the user's ID; and (e) comparing the user's ID to the IDs associated with the metadata elements to determine which metadata elements to make available to the user.

31. The method of claim 30 further including the step of assigning access privileges to each of the IDs associated with the metadata elements.

32. The method of claim 31 further including the step of allowing the user to read, write, or modify each metadata element when the user's ID matches the ID associated with each metadata element.

33. A network server for controlling access to image file metadata, comprising:

means for storing a plurality of image files, each of the image files having metadata elements defined therein and data populating each of the metadata elements, each of the image files further including a list of roles and access privileges associated with each of the metadata elements;

means for receiving a request for one of the image files from a user, wherein the user is assigned at least one role;

means for determining the role assigned to the user from the request; and means for comparing the role assigned to the user with the roles associated with the metadata elements in the image file to determine what metadata elements to make available to the user.

* * * * *

UNITED STATES PATENT AND TRADEMARK OFFICE
CERTIFICATE OF CORRECTION

PATENT NO. : 6,871,231 C1  Page 1 of 1
APPLICATION NO. : 90/010145
DATED : July 20, 2010
INVENTOR(S) : Robert P. Morris It is certified that error appears in the above-identified patent and that said Letters Patent is hereby corrected as shown below:

On the title page of the Ex Parte Reexamination Certificate (7624th):

Item 56, "U.S. Patent Documents:

After

"2002/0016816 A1    2/2002    Rhoads"

Insert

--2004/0015479 A1    1/2004    Meek et al.--

--2005/0251500 A1    11/2005    Vahalia et al.--

Signed and Sealed this

Fifth Day of October, 2010

David J. Kappos
*Director of the United States Patent and Trademark Office*

US 6,871,231 C1

(12) EX PARTE REEXAMINATION CERTIFICATE (7624th)
United States Patent
Morris (10) Number: US 6,871,231 C1
(45) Certificate Issued: Jul. 20, 2010

(54) ROLE-BASED ACCESS TO IMAGE METADATA

(75) Inventor: Robert Paul Morris, Raleigh, NC (US)

(73) Assignee: Fotomedia Technologies, LLC, Portsmouth, NH (US)

Reexamination Request:
No. 90/010,145, Apr. 21, 2008

Reexamination Certificate for:
Patent No.: 6,871,231
Issued: Mar. 22, 2005
Appl. No.: 09/754,178
Filed: Jan. 3, 2001

(51) Int. Cl.
*H04N 1/21* (2006.01)

(52) U.S. Cl. .................. 709/225; 707/999.001; 709/219; 709/229

(58) Field of Classification Search .................. None
See application file for complete search history.

(56) References Cited

U.S. PATENT DOCUMENTS

| | | | |
|---|---|---|---|
| 5,315,657 A | 5/1994 | Abadi et al. .................. 380/25 |
| 5,333,266 A | 7/1994 | Boaz |
| 5,418,908 A | 5/1995 | Keller |
| 5,426,594 A | 6/1995 | Wright |
| 5,493,677 A | 2/1996 | Balogh et al. .................. 395/600 |
| 5,513,117 A | 4/1996 | Small |
| 5,552,994 A | 9/1996 | Cannon et al. |
| 5,555,496 A | 9/1996 | Tackbary |
| 5,572,643 A | 11/1996 | Judson |
| 5,584,025 A | 12/1996 | Keithley |
| 5,708,825 A | 1/1998 | Sotomayor |
| 5,748,484 A | 5/1998 | Cannon et al. |
| 5,758,324 A | 5/1998 | Hartman |
| 5,760,916 A | 6/1998 | Dellert |
| 5,760,917 A | 6/1998 | Sheridan |
| 5,764,235 A | 6/1998 | Hunt |
| 5,771,355 A | 6/1998 | Kuzma |
| 5,778,164 A | 7/1998 | Watkins et al. |
| 5,781,901 A | 7/1998 | Kuzma |
| 5,790,790 A | 8/1998 | Smith |
| 5,790,793 A | 8/1998 | Higley |
| 5,832,221 A | 11/1998 | Jones |
| 5,867,633 A | 2/1999 | Taylor |
| 5,893,101 A | 4/1999 | Balogh |
| 5,898,835 A | 4/1999 | Truong |
| 5,903,723 A | 5/1999 | Beck et al. |
| 5,923,846 A | 7/1999 | Gage |
| 5,987,504 A | 11/1999 | Toga |
| 6,009,462 A | 12/1999 | Birrell |
| 6,014,644 A | 1/2000 | Erickson |
| 6,017,157 A | 1/2000 | Garfinkle |
| 6,026,449 A | 2/2000 | Takenaka |
| 6,052,514 A | 4/2000 | Gill |
| 6,085,195 A | 7/2000 | Hoyt |
| 6,119,135 A | 9/2000 | Helfman |
| 6,182,127 B1 | 1/2001 | Cronin |
| 6,192,407 B1 | 2/2001 | Smith |
| 6,253,216 B1 | 6/2001 | Sutcliffe |

(Continued)

OTHER PUBLICATIONS

Sandhu et al., "Role-Based Access Control Models," IEE Computer, vol. 29, No. 2, pp. 38–47, Feb. 1996.
Burkhard Wiegel, *Secure External References in Multimedia Email Messages*, 3rd ACM Conference On Computer And Communications Security, Mar. 14–16, 1996 ("Weigel").
*Pictra Wins PMA '97 Innovative Product Award*, Business Wire, Mar. 13, 1997.

(Continued)

*Primary Examiner*—Matthew Heneghan (57) ABSTRACT

A system and method for controlling access to image metadata is disclosed, where metadata elements are defined for an image. The method and system include associating users who will access the image with roles, and associating the roles with individual metadata elements. In response to receiving a request for access to the metadata by a particular user, the user's role is determined from the request and the user's role is compared to the roles associated with the metadata elements to determine which metadata elements to make available to the user.

U.S. PATENT DOCUMENTS

| | | |
|---|---|---|
| 6,275,848 B1 | 8/2001 | Arnold |
| 6,321,231 B1 | 11/2001 | Jebens et al. ............... 707/104 |
| 6,401,097 B1 | 6/2002 | McCotter |
| 6,430,591 B1 | 8/2002 | Goddard |
| 6,434,607 B1 | 8/2002 | Haverstock et al. ......... 709/217 |
| 6,453,353 B1 | 9/2002 | Win et al. .................. 709/229 |
| 6,564,225 B1 | 5/2003 | Brogliatti et al. ......... 707/104.1 |
| 6,573,927 B2 | 6/2003 | Parulski |
| 6,748,382 B1 | 6/2004 | Mohan |
| 6,915,433 B1 | 7/2005 | Barber |
| 6,947,959 B1 | 9/2005 | Gill |
| 7,096,226 B2 | 8/2006 | Brock |
| 7,185,092 B2 | 2/2007 | Furui |
| 2002/0016816 A1 | 2/2002 | Rhoads |

OTHER PUBLICATIONS

*Pictra first to make publishing and sharing photo albums over Internet snap,* Business Wire, May 12, 1997.

"Pictra Puts Your Photo Album on the Web for Free," PC World, Jun. 13, 1997.

Pictra website www.pictra.com/prodser/main.html#6 as archived on Oct. 9, 1997.

Pictra website www.pictra.com/prodser/net_overview.html as archived on Oct. 9, 1997.

Web pages of www.kodak.com, available through archive.org with a reference date of May 23, 1997.

*Kodak Touts New Technology,* Chain Drug Review 19.n6 at p. 76 (Mar. 17, 1997).

*Kodak offers Retailers, Users New Benefits in Tradition and Digital Products at PMA,* Business Wire, Feb. 20, 1997.

"The Digital Postcard" website ("The Digital Postcard"). Available at least at www.all–yours.net/postcard. Aspects of The Digital Postcard are described in web pages of www.all–yours.net available through www.arquive.org with a reference date of Jan. 13, 1997.

Web pages of www.photonet.com available through archive.org with a reference date of Dec. 31, 1996 and Apr. 8, 1997.

*Picture This American Greetings On–Line Introduces Add–a–Photo™ Cards to Web Site Offering: PictureVision Partnership Brings Internet Photo Technology to Greeting Cards;* PR Newswire, Dec. 12, 1996.

*Adobe PhotoDeluxe Expands Internet Functionality; AT&T WorldNet and PhotoNet Online Services Provide Easy Internet Image Distribution,* PR Newswire, Feb. 10, 1997.

Picturevision and MGI Software to Integrate Photonet with MGI Photosuite, Feb. 20, 1997.

*Tumbleweed Software Announces Tumbleweed Posta Support for PaperPort; The Complete Solution for 'Scan and Send' Document Delivery,* Business Wire, Mar. 31, 1997.

*Tumbleweed Software Ships First Secure Internet Courier; Net Product Combines Express Delivery Features with Power of Technology.* Business Wire, Jun. 9, 1997.

"The Electric Postcard" Web pages available through archive.org at postcards.www.media.mit.edu with a reference date of Nov. 11, 1996.

*Seasons Greeting from the Internet; Send Zippy Holiday Cards without a Zip Code,* The Boston Herald, Dec. 8, 1995.

*Netropolitan,* New Scientist, Apr. 8, 1995.

*Electric Greetings,* Associated Newspapers Ltd., Mail on Sunday, Oct. 15, 1995.

*Sending 'Postcards' Via the Internet,* Plain Dealer, Jul. 1, 1996.

*Pictureplace, AOL's Innovative Online Photo Service, Becomes Pictureweb; Announces Strategic Alliances with Adobe Systems and Mystic Color Lab,* PR Newswire, Jan. 4, 1996.

*America Online and Pictureplace Break New Ground with First Online Photo Service; New Service Redefines Traditional Picture Processing with Real–Time Generation Online,* PR Newswire, Sep. 20, 1995.

America Online Offers 'Online Photo Service', Newsbytes, Sep. 22, 1995.

Marshall, et al., *Document Management Software: Making Order Out of Chaos,* Infoworld, Jul. 10, 1995, p. 56 ("Marshall").

McCray, et al., *Extending the Role of Metadata in a Digital Library System,* Proc. IEEE Forum On Research and Technology Advances in Digital Libraries, 1999; 190–9. ("McCray").

Chronaki et al. *12Cnet Medical Image Annotation Service,* Medical Informatics, Special Issue, vol. 22(4), 337–347 (1997) ("Chronaki").

William Yeo Arms, *Implementing Policies for Access Management D–Lib Magazine,* Feb. 1998 ("Arms").

Dewan et al., *Early Prototypes of the Repository for Patterned Injury Data,* Digital Libraries Proceedings, Jun. 11–13, 1995, 123–130 ("Dewan").

Zhang et al., *Daphne—A Tool for Distributed Web Authoring and Publishing,* Proceedings of the Annual Conference of American Society of Information Science, Nov. 1999 ("Zhang Nov. 1999").

Rubin et al., *Web–based Access to Teaching Files in a Filmless Radiology Environment,* Proceedings of the SPIE Conference on PACS Design and Evaluation, vol. 3339, 520, Feb. 1998 ("Rubin").

Zhang et al., *Role Based Access Control in Online Authoring and Publishing Systems vs. Document Hierarchy,* Proceedings of the 17th Annual International Conference on Computer Documentation, Sep. 1999 ("Zhang Sep. 1999").

*Hypertext Transfer Protocol—HTTP/1.0,* T. Berners–Le et al. (Nov. 28, 1994).

*HTMl. 3.2 Reference Specification,* D. Raggett, May 1996, Sep. 9, 1996, Jan. 14, 1997.

*HTMl. 3.2 Document Type Definition,* D. Raggett, Jun. 25, 1996.

*RFC 1867, Form Based File Upload in HTML.,* E. Nebel et al., Nov. 1995.

*Greet.com* website (as archived on Nov. 5 and Dec. 26, 1996 at http://www.greet.com; http://greet.com/birthday/index.html.

Greet Network website (as archived on Dec. 27, 1996 at http://www.netropolis.org).

Email: *The Internet Mall: Shopping on the Information Highway,* source: internet, May 6, 1996, pp. 1–30.

Create Beautiful Web Valentines Email (Feb. 4, 1996).

American Greetings Introduces Animated Greetings—Personalized Electronic Cards that Sing, Dance and Croak, partnership with Pinneapple Ltd. Yields E–mails with Pizzazz, PR Newwire (Dec. 18, 1996).

"Start your engines and get ready to enter the Web," Jerusalem Post (Oct. 11, 1996).

Greetme.com website (as archived Oct. 28, 1996 at http://www.greetme.com).

Virtual Presents website (as archived Jul. 23, 1996, Nov. 15, 1996 and Apr. 15, 1997 at http://www.virtualpresents.com, http://www.virtualpresents.com/new html, http://www.virtualpresents.com/myown.html.

Aug. 30, 1996 Email from package–room@virtualpresents.com.

Oct. 23, 1996 Email from package–room@virtualpresents.com.

"NEC announces novice–user multimedia authoring tool for web sites and presentations", M2 Presswire, May 2, 1996.

Dan Lassig, Randy Louie, John Williams, Sumio Yamada, Jun Takamura, "NetMC: Multimedia Authoring Tool for Internet" NEC Technical Journal, vol. 50, No. 4, pp. 53–57, Apr. 25, 1997.

Dec. 9, 1996—"Polaroid becomes first company to offer free URL to digital greeting card participants on the World Wide Web," Business Wire.

21$^{st}$ Century Greeting Card Company website (as archived Nov. 14, 1996 at http://sacbiz.com/21egreet/birthday.html.

Arizona WebHub Postcard website (as archived Oct. 28, 1996 at http://arizonawebhub.com/postcards/postcards.html.

Arizona WebHub Postcard website (as archived Oct. 28, 1996, Nov. 10, 1996 at http://www.marlo.com, http://www.marlo.com/postcard.htm, http://www.marlo.com/sendout.htm, http://www.marlo.com/cardhelp.htm, http://www.marlo.com/cardfind.htm, http://www.marlo.com/findhelp.htm, and http://www.marlo.com/card.

Family Planet House of Cards website (as archived Oct. 17, 1996 and Oct. 18, 1996 at http://family.starware.com/ecards/index.html.

The Build–A–Card website (as archived Oct. 31, 1996 at http://www.buildacard.com/faq.htm, http://www.buildacard.com, http://buildacard.com/best.

May 4, 1996—Email from Gleason Sackman re Free Online Greeting Cards.

Nov. 23, 1996—Email from Gleason Sackman re Free Electronic Postcards.

Jan. 30, 1996—Email from Gleason Sackman re Build–A–Card.

The David Jones Send A Card website (as archived Feb. 14, 1997 at http://davidjones.com.au/send_card.htm).

Ralph Martinez, Bijal Sutarita, *A Distributed File Management System for Remote Consultation and Diagnosis in Global PACS*, SPIE, vol. 2165, pp. 58–69, Date: unknown.

Heiko Thimm, Katja Rohr, Thomas C. Rakow, *A Mail–Based Teleservice Architecture for Archiving and Retrieving Dynamically Composable Multimedia Documents*, source: unknown, pp. 1–19, Date: unknown.

Hurst F. Wedede Jens–Oliver P. Siepmann, *A Universal Framework for Managing Metadata in the Distributed Dragon Slayer System*, IEEE 2000, 1089–6503/00, pp. 96–101.

*American Greetings Corporation Extends Commitment to Electronic Marketplace; Alliances with Industry Leaders Strengthen Venture*, PR Newswire Associates, Inc., Sep. 4, 1996.

*Awesome Postcards by Awesome Cyber Greeting Cards*, source: internet, pp. 1–5.

*BC Yellowpages.com—Birthday Cards*, source: internet, pp. 1–2.

Eric A. Meyer, Peter Murray, *Borealis Image Server*, Case Western Reserve University, pp. 1–17, Date: unknown.

Stephen Campbell, *Campus Email for Everyone: Making It Work in Real Life*, Dartmouth Collage, pp. 1–12, Feb. 1994.

Reg McClellan, *Free Throws 0089*, Canadian Wheelchair Basketball Association, pp. 1–2, Feb. 14, 1997.

Virginia E. Ogle, Michael Stonebraker, *Chabot: Retrieval from a Relational Database of Images*, IEEE 1995 0018–9162/95, pp. 40–48.

Brian Dunkel, Nandit Soparkar, Peter Weinstein, *Customized Metadata for Internet Information*, IEEE 1997 First International Conference on Knowledge–Based Intelligent Electronic System, May 21–23, 1997, pp. 508–516, Adelaide, Australia.

*Cyber Greetings Sending Instant Holiday Cards is Just a Click Away*, The Kansas City Star Co. (kansacity.com), Dec. 21, 1996, pp. 1–3.

Mary Thompson, William Johnston, Jin Guojun, Jason Lee, Brian Tierney, Joseph F. Terdiman, *Distributed health care imaging information systems*, SPIE, vol. 3035, pp. 97–106, Date: unknown.

Heiko Thimm, Ulrich Marder, Gunter Robbert, Klaus Meyer–Wegener, *Distributed Multimedia Databases as Component of a Teleservice for Workflow Management*, source: unknown, pp. 1–20, Date: unknown.

Bernard Holkner, EdMOO: One approach to a multimedia collaborative environment, Learning Technologies: Prospects and Pathways (EdTech 96), pp. 1–7.

T.V. Batista, N.L.R. Rodriguez, L.F.G. Soares, M.C. Resende, *Hypermedia mail Over WWW*, IEEE, 1996, Doc. No. 0–7803–33047/96, pp. 83–89.

Howard Besser, Rosalie Lack, *Image and Metadata Distribution at Seven University Campuses: Reports from a Study of the Museum Educational Site Licensing Project*, ECDL '99, LNCS 1696, pp. 3–18, Springer–Verlag Berlin Heidelberg.

Sarantos Kapidakis, *Issues in the Development and Operation of a Digital Library*, S. Abiteboul, ECDL '99, LNCS 1696, pp. 363–382, Springer–Verlag Berlin Heidelberg.

Anne–Marie Vercoustre, François Paradis, *Metadata for Photographs: From Digital Library to Multimedia Application*, ECDL '99, LNCS 1696, pp. 39–57, Springer–Verlag Berlin Heidelberg, pp. 1–19.

Anca Vaduva, Klaus R. Dittrich, *Metadata Mangement for Data Warehousing: Between Vision and Reality*, IEEE, 2001, Doc. No. 1098–8068/01, pp. 129–135.

Chaitanya Baru, Richard Frost, Richard Marciano, Reagan Moore, Arcot Rajasekar, Michael Wan, *Metadata to Support Information–Based Computing Environments*, IEEE, 1997, pp. 1–8.

M. Kate Beard, Vyjavanti Sharma, *Multilevel and Graphical Views of Metadata*, Department of Spatial Information Science and Engineering, University of Maine, pp. 1–10, Date: Unknown.

Dan Lassig, Randy Louie, John Williams, Sumio Yamada, Jun Takamura, *NetMC: Multimedia Authoring Tool for Internet*, pp. 1–10, vol. 50, No. 4/1997, pp. 1–7.

*Multimedia Authoring Tool For Web Pages and Standalone Presentations*, 1996, NEC Systems Laboratory, Inc. (netmc@netmc.neclab.com), pp. 1–2.

Ralph Martinez, Pinkesh J. Shah, Yuan–Pin Yu, *Multimedia Consultation Session Recording Playback Using Java–based Browser in Global PACS*, part of the SPIE Conference on PACS Design and Evaluation: Engineering and Clinical Issues, San Diego, CA, Feb. 1998: SPIE, vol. 3339 0277–786X/98, pp. 165–174.

*Multimedia Greeting Cards*, NEC Systems Laboratory, Inc. (netmc@netmc.neclab.com).

Darmadi Komo, Betty Levine, Matthew Freedman, Seong K. Mun, Y.K. Tang, Ted Chiang, *Multimedia medical data archive and retrieval server on the internet, SPIE*, vol. 3035, Doc. No. 0277–786X, pp. 72–75.

Email: *Net–Happenings Digest*, GOOGLE, Apr. 4, 1996, pp. 1–11.

*Net–Happenings Digest*, GOOGLE, Apr. 4, 1996, Special Issue, pp. 1–56.

Email: *Net–Happenings Digest*, GOOGLE, Jan. 30, 1996, Special Issue, pp. 1–10.

*Posta to Deliver Docs., Financial Times*, London Edition, 1 ED, p. 22, Jun. 18, 1997; pp. 14–15.

Soon Ae Chun, Vijayalakshmi Atluri, *Protecting Privacy from Continuous High–resolution Satallite Surveillance, IFIP Conference Proceedings*, vol. 201, Fourteenth Annual Working Conference on Database Data Search and Application Security, Development and Direction, pp. 233–244, 2000, ISBN 0–7923–7514–9.

Nathaniel S. Borenstein, *RFC1344 Implications of MIME for Internet Mail Gateways*, ISOC/IETF (tools.ietf.org), Jun. 1992, pp. 1–10.

N. Freed, K. Moore, *Definition of the URL. MIME External–Body Access–Type*, ISOC/IETF (tools.ietf.org), Oct. 1996, pp. 1–5.

Email: *MISC > Sent your Holiday Cards Yet?*, NEC Systems Laboratory, Inc. (netmc@netmc.neclab.com), Dec. 13, 1996.

Email: *MISC > Sent your Valentine Card Yet ?*, NEC Systems Laboratory, Inc.(netmc@netmc.neclab.com), Feb. 11, 1997.

Email: *SOFT > Free Multimedia Authoring Tool Software*, NEC Systems Laboratory, Inc. (netmc@netmc.neclab.com), Oct. 18, 1996.

Email: *SunOS5.4 Sendmail option—R. Does this work in 8.8.5?*, GOOGLE, May 4, 1997, pp. 1–4.

*The Digital Postcard FAQ*, source: internet, pp. 1–2.

*The Power of Metadata Is Propelling Digital Imaging Beyond the Limitations of Conventional Photography: By Combining Optimized Convenience and Flexibility with Expanded Content and Embedded Intelligence, An Overview of the Opportunities for Implementing Metadata Standards*, by The Digital Imaging Group, DIC35 Initiative, Aug. 1999, pp. 1–7.

Webpage: *Tips About Awesome Cyber Cards and Web Sites in General*, source: internet.

*Under the Sun—Digital Postcards*, 1997, Under the Sun, Inc., source: internet.

Sebastian Rupley, Carol Levin, *Web Photo Finish: New online services for shutterbugs, PC Magazine*, Nov. 5, 1996.

Ned Freed, Keith Moore, *Definition of the URL: MIME External–Body Access–Type*, Internet Draft, ISOC–IETF (tools.ieft.org), Nov. 1995, pp. 1–7.

The GIFfer's File Warehouse, *Desktop Publishing Applications (Page 5 of 12)*, source: internet, pp. 1–2.

*Family Planet House of Cards Help Page E–cards Demystified: A Primer*, source: internet, pp. 1–3.

Jon Udell, *E–Mail Adventures*, Byte.com, Oct. 30, 2007, pp. 1–7.

Email *Free Electronic Postcards*, GOOGLE, Nov. 23, 1996, pp. 1–3.

*Global Communications Leader, DynaLab, and Tumbleweed Announce Worldwide Partnership for Tumbleweed Posta, Business Wire*, Dec. 11, 1996, pp. 1–3.

Website: *Greeting Cards by Awesome Cyber Cards!*, source: internet, pp. 1–3.

Website: *Greet Network Greeting Cards and Webpages*, source: internet pp. 1–2.

Website: *Family Planet House of Cards: Halloween Cards*, source: internet; pp. 1–2.

Website: *How to find your Awesome Cyber Card*, by *Awesome Cyber Cards*, source: internet; pp. 1–5.

Website: *Have your Own Greeting Card Site!*, NEC Systems Laboratory, Inc. (netmc@netmc.neclab.com).

D. Raggett, *HTML 3.2 Reference Specification: W3C Working Draft*, Sep. 9, 1996, Source: internet, pp. 1–42.

Webpage: *Image Alchemy*, Handmade Software, Inc., 1990–97; pp. 1–2.

*Information Technology: Safe delivery of electronic documents, Financial Times*, London Edition, 1 Ed., p. 22, Jun. 18, 1997, pp. 1–2.

Webpage: *Virtual Presents Network* (virtualpresents.com): *Let me choose my own Present*.

Galen Gruman, *A FedEx for the Internet, Macworld*, v. 14, n. 2, p. 37, Feb. 1997.

*Tumbleweed Posta to Support Microsoft's® Active Platform, PR Newswire*, Dec. 10, 1996, pp. 1–3.

*Tumbleweed Software CEO Pushes for Real–World Solutions at Internet Showcase, PR Newswire*, Apr. 29, 1997, pp. 1–2.

*Tumbleweed Posta news search (1996–Jun. 1997), Computer Reseller News*, n. 725, p. 73, Mar. 3, 1997.

InfoWorld, v. 18, No. 50 at. 6 (Dec. 9, 1996).

Mitch Wagner, *Web used to distribute documents (Tumbleweed Software's Posta Software)(Product Announcement), Computerworld*, v. 31, n. 8, p. 14, Feb. 24, 1997.

David Ferraiolo, Richard Kuhn, *Role–Based Access Control*, Reprinted from: *Proceedings of 15th National Computer Security Conference*, 1992, pp. 1–11.

National Institute of Standards and Technology: Information Technology Library, *Role Based Access Control—Frequently Asked Questions*, source: internet, pp. 1–3.

"Signal," *Dictionary of Computers, Information Processing, and Telecommunications*, 2nd Ed., Dec. 16, 1987, p. 574 (4 pgs.), John Wiley & Sons, Inc., J. Rosenberg, Editor.

"MOM.COM," *Times–Picayune*, New Orleans, LA, "Living" Section, p. E1, May 9, 1996, The Times–Picayune Publishing Company.

"NEC Announces Official Release of NetMC; Multimedia Authoring Tool, wth Netscape Navigator and Microsoft Internet Explorer Support, Available through Internet Software Superstore," *Business Wire*, Oct. 21, 1996, 6 pgs.

"Tumbleweed App Lets Users Send Files in Any Form," *MacWEEK*, v.10, n.48, p. 18(2), Dec. 16, 1996.

"Information Technology: Safe delivery of electronic documents," *Financial Times*, London Ed., 1st Ed., p. 22, Jun. 17, 1997.

English language translation of a document identified as: Dan Lassig, Randy Louie, John Williams, Sumio Yamada, Jun Takamura: "NetMC:Multimedia Authoring Tool for Internet," *NEC Technical Journal*, vol. 50, No. 4, pp. 53–57, Apr. 25, 1997, Kabushiki Kaisha NEC Creative.

Clubphoto.com website (as archived Jan. 17, 1999 at http://web.archive.org/web/19990117031023/http://www.clubphoto.com/index.html).

eCircles.com website (as archived Feb. 8, 1999 at http://web.archive.org web/ 19990208230746/www.ecircles.com/magic/products/gate/login.cgi).

eMemories.com website (as archived Oct. 13, 1999 at http://web.archive.org/web/19991013042805/http://ememories.com.com/.

Gatherround.com website (as archived Nov. 28, 1999 at http://web.archive.org/web/19991128113715/www.gatherround.com/.

Imagestations.com website (as archived Aug. 15, 2000 at http://web.archive.org/web/20000815072958/http://www.imagestations.com/.

Photoloft.com website (as archived Dec. 3, 1998 at http://web.archive.org/web/19981203024545/http://www.photoloft.com/.

Photopoint.com website (as archived Dec. 2, 1998 at http://web.archive.org/web/19981202183105/http://www.photopoint.com/index.html.

Picturetrail.com website (as archived Apr. 8, 2000 at http://web.archive.org/web/20000408044434/http://www.picturetrail.com/.

TheDigitalfridge.com website (as archived Nov. 28, 1999 at http://web.archive.org/web/19991128064217/http://thedigitalfridge.com/.

Zing.com website (as archived Nov. 11, 1998 at http://web.archive.org/web/19981111191346/http://www.zing.com/.

Zing.com website (as archived Feb. 29, 2000 at http://web.archive.org/web/20000229102539/www.zing.com/.

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 9-16 and 25-33 are cancelled.

Claims 1 and 17 are determined to be patentable as amended.

Claims 2-8 and 18-24, dependent on an amended claim, are determined to be patentable.

New claims 34-36 are added and determined to be patentable.

1. A method for controlling access to image metadata, comprising the steps of:
   (a) defining metadata elements for an image;
   (b) associating users who will access the image with roles;
   (c) associating the roles with individual metadata elements;
   (d) receiving a request for access to the *image and* metadata by a particular user, wherein the user's role is determined from the request; and
   (e) comparing the user's role to the roles associated with the metadata elements to determine which metadata elements to make available to the user;
   *wherein determining the user's role from the request includes the associating of users who will access the image with roles by assigning, in response to the request, a role to the particular user for accessing the individual metadata elements, and*
   *wherein the role for accessing the individual metadata elements is assigned for the image requested such that different roles are assigned to the particular user for different requests for access to the same individual metadata elements but for different images.*

17. A computer readable medium containing program instructions for controlling access to image metadata, the instructions for:
    (a) defining metadata elements for an image;
    (b) associating users who will access the image with roles;
    (c) associating the roles with individual metadata elements;
    (d) receiving a request for access to the *image and* metadata by a particular user wherein the user's role is determined from the request; and
    (e) comprising the user's role to the roles associated with the metadata elements to determine which metadata elements to make available to the user;
    *wherein determining the user's role from the request includes the associating of users who will access the image with roles by assigning, in response to the request, a role to the particular user for accessing the individual metadata elements, and*
    *wherein the role for accessing the individual metadata elements is assigned for the image requested such that different roles are assigned to the particular user for different requests for access to the same individual metadata elements but for different images.*

*34. The method of claim 1, wherein each role is assigned one or more access privileges and comparing the role assigned to the user with the roles associated with the individual metadata elements to determine which individual metadata elements to make available to the user comprises:*
   *querying one or more roles associated with a metadata element to determine if the role assigned to the user is found;*
   *if the role assigned to the user is not found among the one or more associated roles, denying access to the metadata element;*
   *if the role assigned to the user is found among the one or more associated roles, then determining if the type of access requested matches one of the one or more assigned access privileges for the role assigned to the user;*
   *if the type of access requested matches one of the one or more assigned access privileges for the role assigned to the user, returning data corresponding to the metadata element to the user as requested; and*
   *if the type of access requested does not match one of the one or more assigned access privileges for the role assigned to the user, denying the request to access the image metadata.*

*35. The method of claim 1, wherein the association between the roles and the individual metadata elements is made separate from any association of users with the individual metadata elements.*

*36. The computer readable medium of claim 17, wherein the association between the roles and the individual metadata elements is made separate from associating users with the individual metadata elements.*

\* \* \* \* \*